US012574241B2

(12) United States Patent　　　(10) Patent No.:　US 12,574,241 B2
Formaini et al.　　　　　　　　　(45) Date of Patent:　Mar. 10, 2026

(54) TECHNIQUES FOR MANUAL VERIFICATION

(71) Applicant: APPLE INC., Cupertino, CA (US)

(72) Inventors: Cristina L. Formaini, San Francisco, CA (US); Bailey E. Basile, Cupertino, CA (US); Per Love Hornquist Astrand, Saratoga, CA (US); Yannick L. Sierra, San Francisco, CA (US); Erik D. Strahm, Mountain View, CA (US); Benton C. Case, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 334 days.

(21) Appl. No.: 18/131,801

(22) Filed: Apr. 6, 2023

(65) Prior Publication Data

US 2023/0396439 A1　　Dec. 7, 2023

Related U.S. Application Data

(60) Provisional application No. 63/365,873, filed on Jun. 5, 2022.

(51) Int. Cl.
H04L 9/32　　　　(2006.01)
H04L 9/08　　　　(2006.01)
(Continued)

(52) U.S. Cl.
CPC .......... H04L 9/3226 (2013.01); H04L 9/0869 (2013.01); H04L 9/088 (2013.01); H04L 9/14 (2013.01); H04L 9/30 (2013.01)

(58) Field of Classification Search
CPC ... H04L 9/0869; H04L 9/0861; H04L 9/3236; H04L 9/32; H04L 9/3271; H04L 9/3273; H04W 12/06; H04W 12/069
See application file for complete search history.

(56) References Cited

U.S. PATENT DOCUMENTS 9,043,596 B2 *　5/2015　Jung ...................... H04L 9/0844
　　　　　　　　　　　　　　　　713/168
11,677,554 B2 *　6/2023　Basile ...................... H04L 9/14
　　　　　　　　　　　　　　　　380/30
(Continued)

FOREIGN PATENT DOCUMENTS

WO　　WO-2023213383 A1 *　11/2023　............ H04W 12/50

OTHER PUBLICATIONS

Vaudenay, Serge, article entitled "Secure Communications over Insecure Channels Based on Short Authenticated Strings," EPFL, CH-1015 Lausanne, Switzerland, printed from http://lasecwww.ep¤.ch in 18 pages.

(Continued)

*Primary Examiner* — Tae K Kim
(74) *Attorney, Agent, or Firm* — Kilpatrick Townsend & Stockton LLP

(57)　　　　　ABSTRACT

A device may include accessing first public key associated with a first user identifier for the first electronic device and a second public key associated with a second user identifier for a second electronic device. The device can generate a first random number and a first commitment using a hash function and the first random number; transmit a first message to the second electronic device via a channel between the first and second electronic devices. The device can receive a message from the second electronic device via the channel including include a second random number generated by the second electronic device. The device can extract a code via the hash function using the first public key, the second public key, the first random number, and the second random number. The device can present the code on a user interface for verification. The user interface can receive confirmation of the verification.

20 Claims, 9 Drawing Sheets

(51) Int. Cl.
    *H04L 9/14*           (2006.01)
    *H04L 9/30*           (2006.01)

(56)           References Cited

U.S. PATENT DOCUMENTS

| | | | |
|---|---|---|---|
| 2003/0233550 A1* | 12/2003 | Brickell | G06F 21/85 |
| | | | 713/171 |
| 2011/0053558 A1* | 3/2011 | Teague | H04W 12/50 |
| | | | 455/411 |
| 2011/0191586 A1* | 8/2011 | Jung | H04L 9/3271 |
| | | | 713/168 |
| 2016/0212103 A1* | 7/2016 | Rhoads | H04L 63/0869 |
| 2017/0208045 A1* | 7/2017 | Huh | H04L 9/3247 |
| 2021/0297851 A1* | 9/2021 | Weng | H04W 12/0433 |

OTHER PUBLICATIONS

Nguyen, L.H., article entitled "Authentication Protocols based on Low-Bandwith Unspoofable Channels: A Comparative Survey," Oxford University Computing Laboratory, Wolfson Building, Parks Road, Oxford, OXI 3QD, UK in 53 pages.
Nguyen, L.H., article entitled "Efficient Group Authentication Protocols Based on Human Interaction," Oxford University Computing Laboratory in 23 pages.

* cited by examiner

Conformance Check - 312
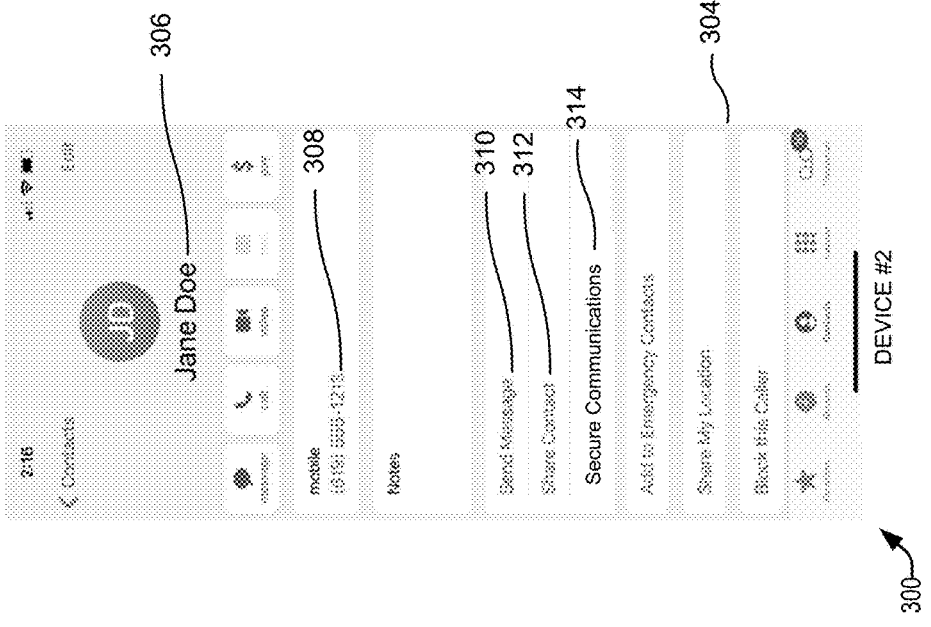
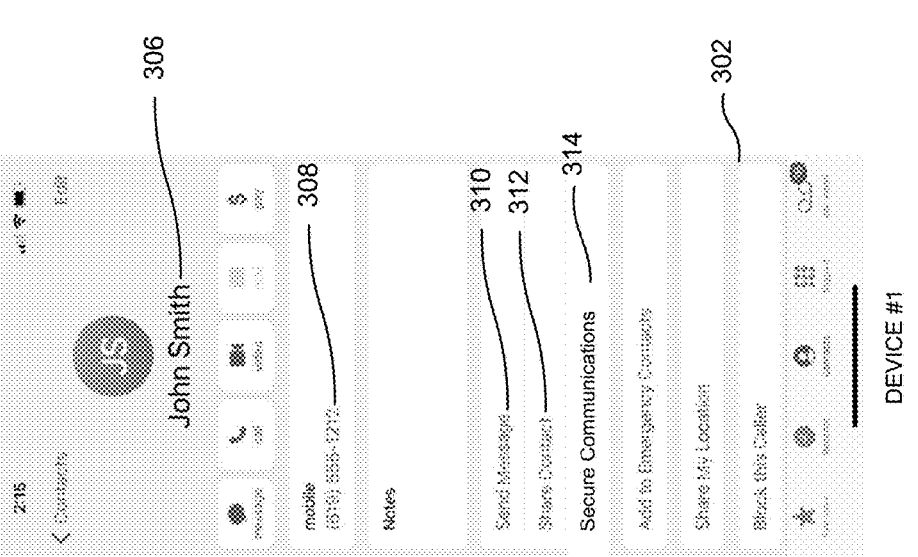
FIG. 3

Conformance Check - 412

Encryption Details
THIS CONVERSATION
0261 1646 406
☑ Marked as Verified 410
CONFIRM 414
Show Account Keys...
DEVICE #1
402
400

Encryption Details
THIS CONVERSATION
0261 1646 408
☑ Marked as Verified 412
CONFIRM 416
Show Account Keys...
DEVICE #2
404
400

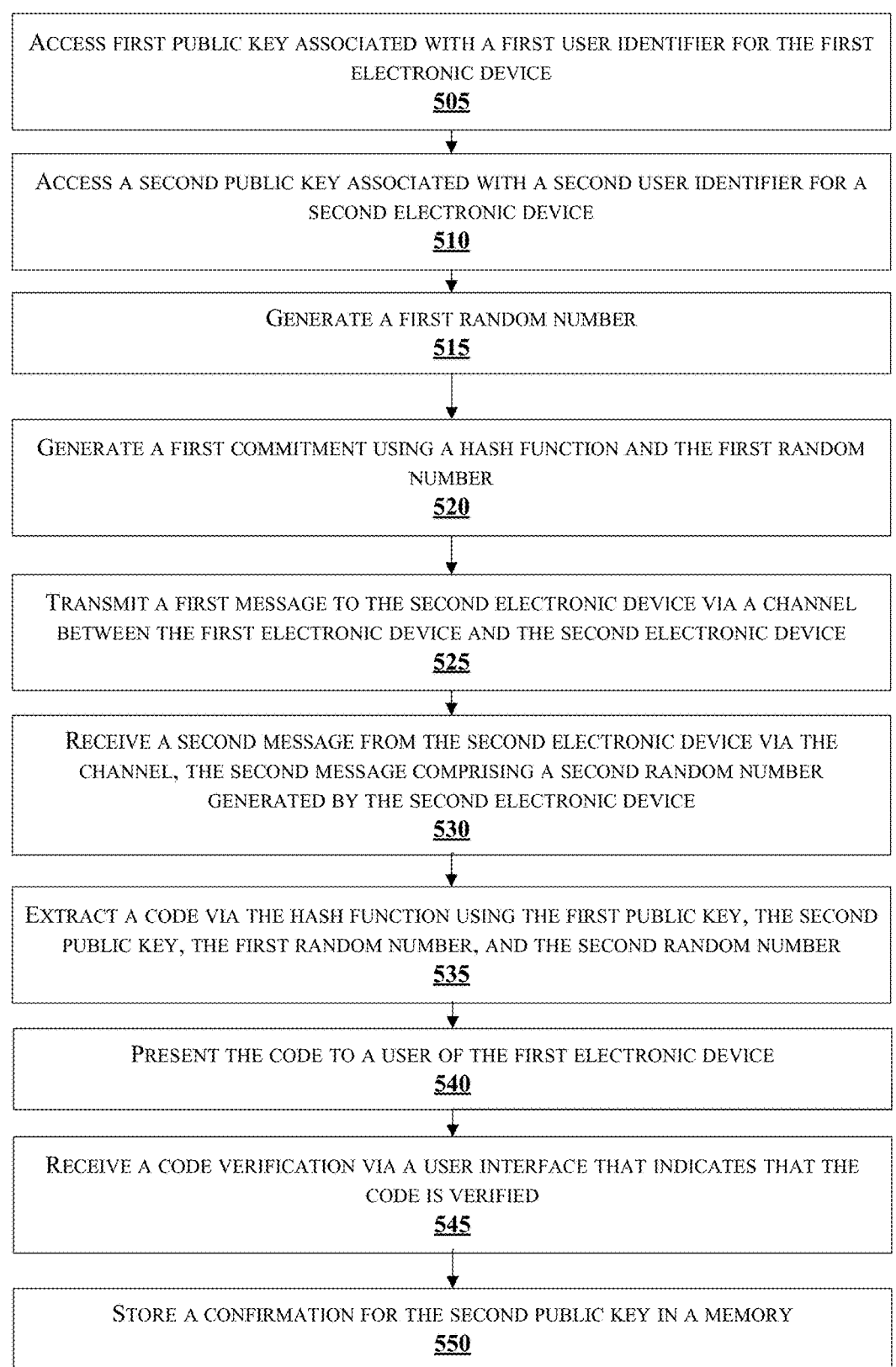

ACCESS FIRST PUBLIC KEY ASSOCIATED WITH A FIRST USER IDENTIFIER FOR THE FIRST ELECTRONIC DEVICE
505

ACCESS A SECOND PUBLIC KEY ASSOCIATED WITH A SECOND USER IDENTIFIER FOR A SECOND ELECTRONIC DEVICE
510

GENERATE A FIRST RANDOM NUMBER
515

GENERATE A FIRST COMMITMENT USING A HASH FUNCTION AND THE FIRST RANDOM NUMBER
520

TRANSMIT A FIRST MESSAGE TO THE SECOND ELECTRONIC DEVICE VIA A CHANNEL BETWEEN THE FIRST ELECTRONIC DEVICE AND THE SECOND ELECTRONIC DEVICE
525

RECEIVE A SECOND MESSAGE FROM THE SECOND ELECTRONIC DEVICE VIA THE CHANNEL, THE SECOND MESSAGE COMPRISING A SECOND RANDOM NUMBER GENERATED BY THE SECOND ELECTRONIC DEVICE
530

EXTRACT A CODE VIA THE HASH FUNCTION USING THE FIRST PUBLIC KEY, THE SECOND PUBLIC KEY, THE FIRST RANDOM NUMBER, AND THE SECOND RANDOM NUMBER
535

PRESENT THE CODE TO A USER OF THE FIRST ELECTRONIC DEVICE
540

RECEIVE A CODE VERIFICATION VIA A USER INTERFACE THAT INDICATES THAT THE CODE IS VERIFIED
545

STORE A CONFIRMATION FOR THE SECOND PUBLIC KEY IN A MEMORY
550

Opt-in/Out

Figure 7:
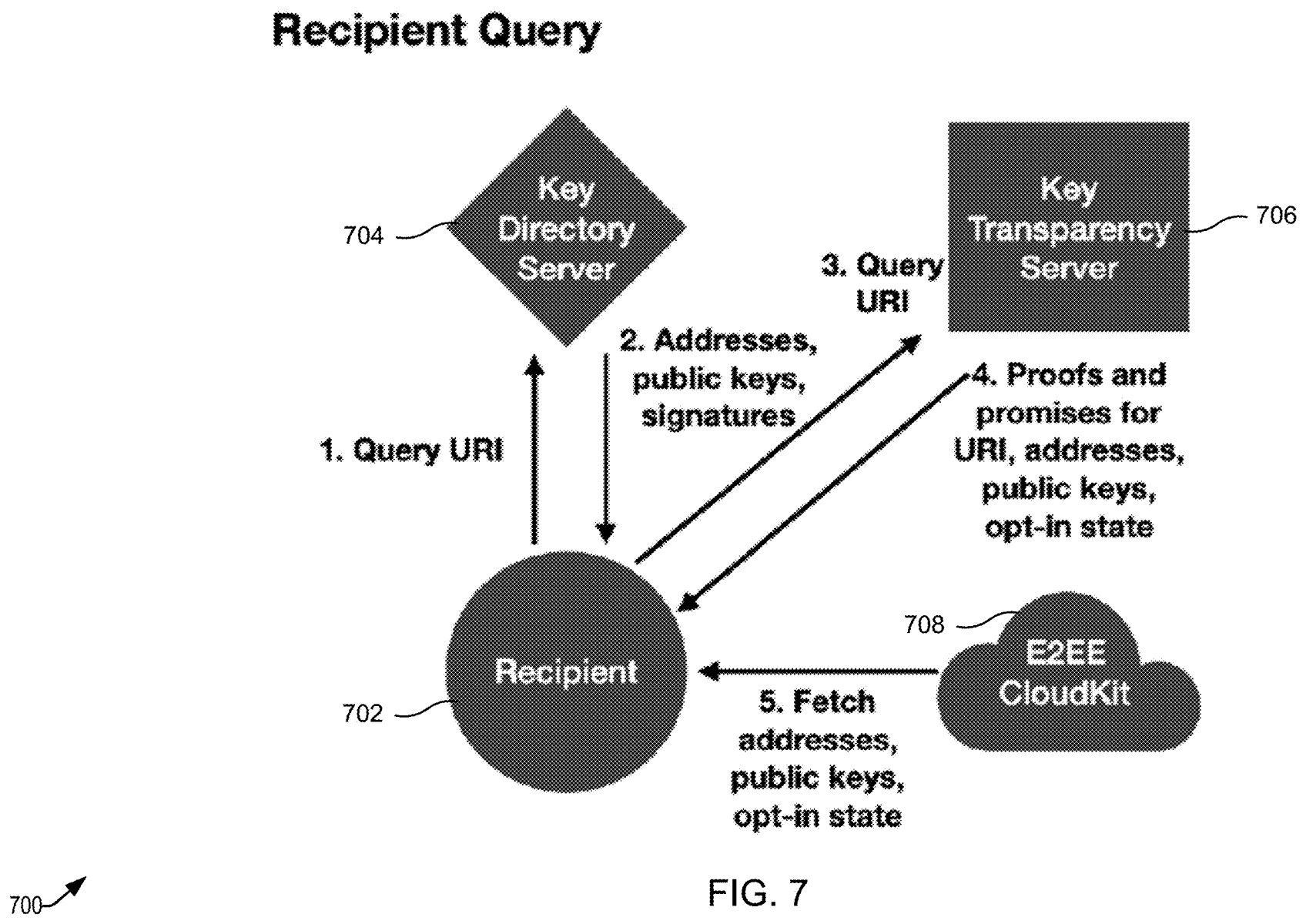

Recipient Query

Key Transparency Server — 706

Key Directory Server — 704

E2EE CloudKit — 708

Recipient — 702

1. Query URI

2. Addresses, public keys, signatures

3. Query URI

4. Proofs and promises for URI, addresses, public keys, opt-in state

5. Fetch addresses, public keys, opt-in state

Figure 8:
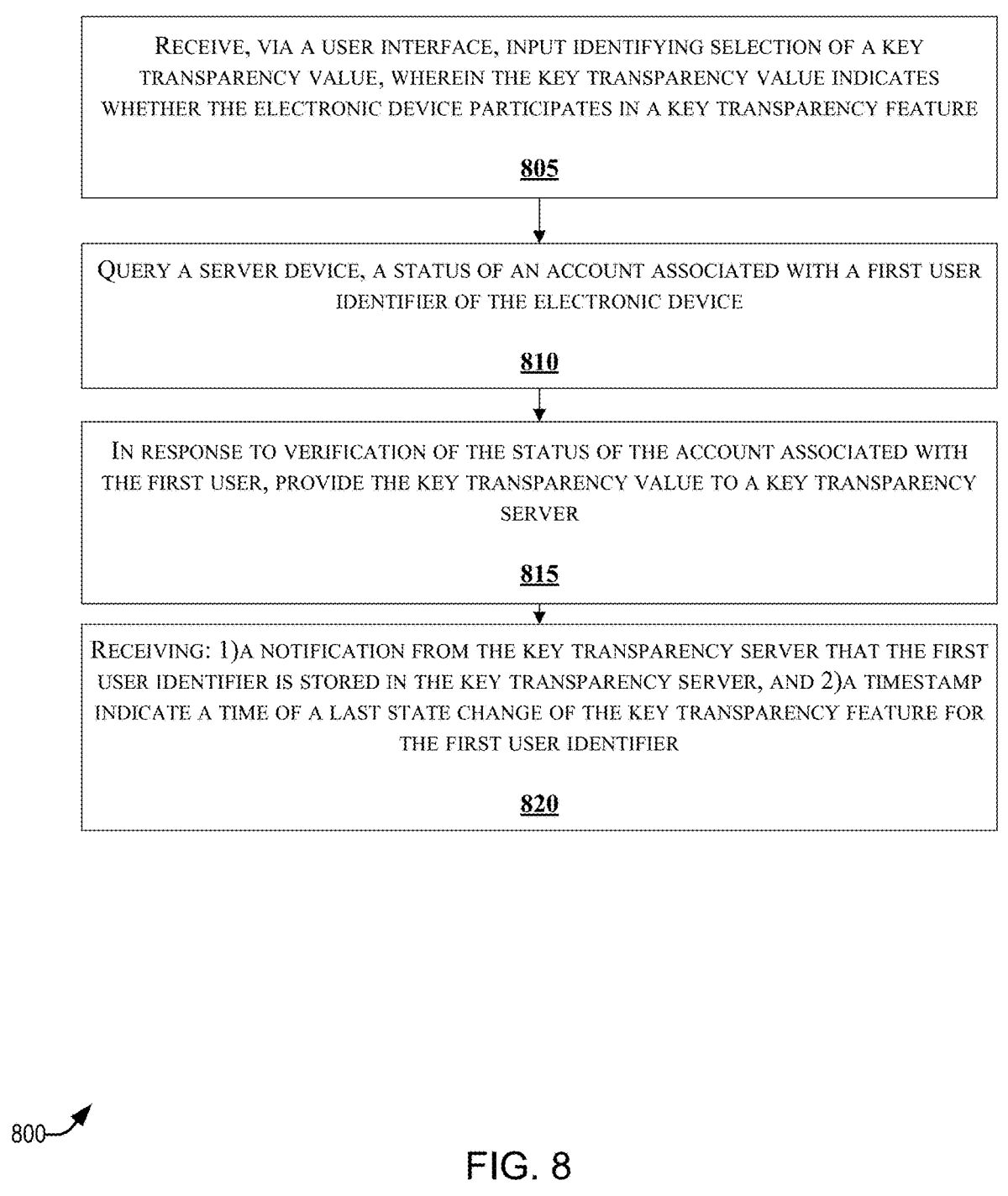

RECEIVE, VIA A USER INTERFACE, INPUT IDENTIFYING SELECTION OF A KEY TRANSPARENCY VALUE, WHEREIN THE KEY TRANSPARENCY VALUE INDICATES WHETHER THE ELECTRONIC DEVICE PARTICIPATES IN A KEY TRANSPARENCY FEATURE

805

QUERY A SERVER DEVICE, A STATUS OF AN ACCOUNT ASSOCIATED WITH A FIRST USER IDENTIFIER OF THE ELECTRONIC DEVICE

810

IN RESPONSE TO VERIFICATION OF THE STATUS OF THE ACCOUNT ASSOCIATED WITH THE FIRST USER, PROVIDE THE KEY TRANSPARENCY VALUE TO A KEY TRANSPARENCY SERVER

815

RECEIVING: 1)A NOTIFICATION FROM THE KEY TRANSPARENCY SERVER THAT THE FIRST USER IDENTIFIER IS STORED IN THE KEY TRANSPARENCY SERVER, AND 2)A TIMESTAMP INDICATE A TIME OF A LAST STATE CHANGE OF THE KEY TRANSPARENCY FEATURE FOR THE FIRST USER IDENTIFIER

TECHNIQUES FOR MANUAL VERIFICATION

CROSS-REFERENCES TO RELATED APPLICATIONS

This application claims the benefit to U.S. Provisional Application No. 63/365,873, filed Jun. 5, 2022, entitled "Techniques For Key Transparency," the disclosures which is incorporated by reference in its entirety and for all purposes.

BACKGROUND

Mobile devices have traditionally allowed users to exchange messages via the short message service (SMS). Because SMS is an insecure protocol, more modern messaging systems have transitioned to using end-to-end encryption to ensure that a person intercepting exchanged messages is unable to review the message contents. To facilitate this cryptographic exchange, some messaging systems use a registration service that allows a given mobile device to register device contact information, which can include cryptographic information (e.g., a public key) for establishing a cryptographic exchange with the mobile device. Thus, if a first user wants to send a message to a second user, the first user's device can contact the service to determine the contact information of the second user's device and use the received cryptographic information to establish a secure connection with the second device. In some instances, a user may not trust the information from the registration service. It would be desirable for techniques to verify the information from the registration service.

BRIEF SUMMARY

Certain embodiments of the present disclosure can provide methods, systems, and apparatuses for establishing key transparency for secure messaging. Key transparency can be a set of techniques that allows a key distributor (e.g., device manufacturer) to make publicly verifiable claims about key ownership. The claims can be verified through the efforts of clients verifying consistency of data between the key distributor's key directory servers and their own knowledge of keys of other devices. In addition, third party auditors and monitors can process the underlying data structures and check them for consistency.

One technique for establishing key transparency is referred to as manual verification. A recipient and a sender can perform an authentication protocol over a communication channel to generate short codes that they can be compared over a second communication path (e.g., a voice call, a video call, etc.). Upon successful verification, the sender's device can store the public key in a memory of the recipient's device. Manual verification can obviate the need for the key transparency server.

Manual verification can detect a split view attack being used to confuse one user as to another user's public keys. Manual verification will not detect an attack on two other users.

Electronic device users may want to control the use of key transparency features. Some legacy devices cannot support key transparency features. For example, a first user with a device that supports key transparency features may want to exchange messages with a second user with a legacy device that does not support key transparency features. If the key transparency features are enabled, noncompatible legacy devices cannot be added to the first user's account. In this case the first user may want to opt-out of the key transparency features. By opting out of the key transparency features, the first user can communicate with the second user even though the second user has a noncompatible device. Alternatively, if the first user wants to communicate with a third user having a device capable of key transparency features, the first user can then opt-in to the key transparency features to communicate with the third user.

Reference to the remaining portions of the specification, including the drawings and claims, will realize other features and advantages of embodiments of the present invention. Further features and advantages, as well as the structure and operation of various embodiments of the present invention, are described in detail below with respect to the accompanying drawings. In the drawings, like reference numbers can indicate identical or functionally similar elements.

BRIEF DESCRIPTION OF THE DRAWINGS

FIG. 3 illustrates an example first user interface for manual verification.

FIG. 5 is a flow chart of a process for manual verification of public key information.

FIG. 7 is a flow chart of a process for opt-in/opt-out, according to an example of the present disclosure.

FIG. 8 illustrates a simplified process for recipient query.

DETAILED DESCRIPTION

One technique for establishing key transparency is referred to as manual verification. A recipient and a sender can perform an authentication protocol over a communication channel to generate short codes that they can be compared over a second communication path (e.g., a voice call, a video call, etc.). Upon successful verification of the short codes, the sender's device can store the public key in a memory of the recipient's device. The authentication protocol can be executed when the two electronic devices are online and requires both parties to go into the dedicated user interface (UI). The code may be verified asynchronously (e.g., over an alternative messaging application) and does not require an active call or in person discussion. Manual verification can obviate the need for the key transparency server. A discussion of secure messaging follows.

I. Exchanging Messages Between Users

In some instances, a user may want to use multiple devices to exchange messages with others. For example, a user may initially exchange a set of messages via a phone and then want to continue exchanging messages on another device (e.g., a tablet computer or a laptop computer). In order to appropriately route messages to each of the user's devices, both devices may provide their respective contact information with a registration service, which may associate the provided information with an identity of the user (e.g., a user's phone number). When someone wants to send a message to the user, the sender's device may send a request that identifies the user's phone number to the service and receive the provided information (e.g., the MAC addresses) for both the user's devices. Based on this information, the sender's device may then send a copy of the message to both devices. A potential concern, however, is that an unauthorized actor wanting to snoop on the user's communications may attempt to request that the registration service associate another device with the user's identity. Thus, a sender's device may be deceived into sending a copy of the message to both of user's devices as well as the unauthorized actor's device. As will be described below in various embodiments, a message exchanging system may employ one or more techniques to detect and prevent messages from being sent to a device that is register without a user's permission.

Figure 1:
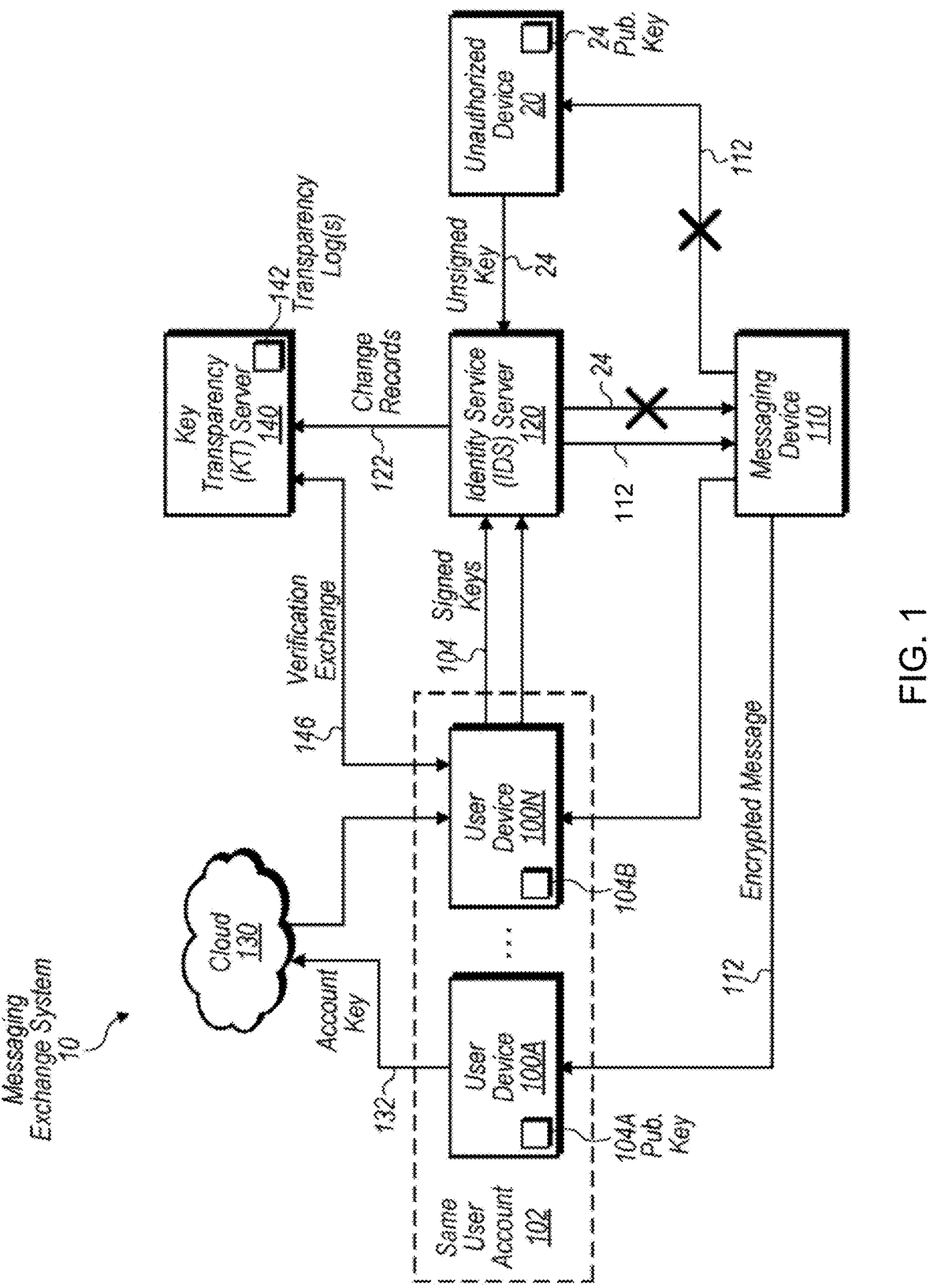
FIG. 1 illustrates a block diagram of a messaging exchange system.

FIG. 1 shows a block diagram of a messaging exchange system 10. In the illustrated embodiment, system 10 includes multiple user devices 100A-N, messaging device 110, identity service (IDS) server 120, cloud 130, and key transparency server 140. In some embodiments, system 10 may include more (or less) components than shown.

User devices 100, in various embodiments, are computing devices belonging to the same user. Accordingly, in the illustrated embodiment, devices 100 may be registered to the same user account 102 of the user, which may be associated with one or more user identifiers (e.g., a phone number, an email address, etc.) that are usable by others to direct messages 112 to the user. In the illustrated embodiment, each user device 100 is also configured to generate a respective public key pair having a private key (not shown) and a corresponding public key 104 usable to decrypt and encrypt messages 112. As used herein, references to a key being "useable to decrypt/encrypt" include decrypting/encrypting with the key or using the key to derive (or decrypt/encrypt) one or more additional keys that are used to decrypt/encrypt data. For example, in some embodiments, when receiving an encrypted message 112, a given device 100 may receive a symmetric key encrypted with its public key 104, decrypt the symmetric key with its private key, and then use the symmetric key to decrypt the encrypted message 112. In another embodiment, devices 100 and 110 may use respectively generated public key pairs to perform a mutually authenticated key exchange to establish a shared symmetric key such an Elliptic-curve Diffie-Hellman (ECDH) key exchange. In the illustrated embodiment, devices 100 exchange public keys 104 with other devices, such as messaging device 110, via IDS server 120.

IDS server 120, in various embodiments, is a server system configured to maintain a database of contact information usable to facilitate the exchange of encrypted messages 112. In some embodiments, the contact information maintained for a given user account 102 may include one or more user identifiers (e.g., email addresses, phone numbers, etc.) for contacting a user, one or more device identifiers (e.g., internet protocol (IP) addresses, universal resource indicators (user identifiers), etc.) for routing messages to specific devices, and the public keys of those devices for exchanging encrypted messages 112. Accordingly, when a given device 100 is added to user account 102, the device 100 may contact server 120 to register its device identifier and public key 104 to have them associated with the user account 102. In various embodiments, the public key for each of the devices 100 can be the same. In various embodiments, there can be just one device 100 associated with an account 102.

When another user of a messaging device 110 later wants to send a message 112 to the user of devices 100, device 110 may send an information request identifying one of the user identifiers to server 120 and receive a corresponding list of device identifiers for registered devices 100 and their corresponding public keys 104. In the illustrated embodiment, device 110 can then send a respective copy of message 112 addressed to each device identifier and encrypted using each device 100's respective public key 104.

As noted above, however, an unauthorized actor may attempt to have IDS server 120 register an unauthorized device 20 with user account 102 in an attempt to deceive messaging device 110 into sending a message 112 to unauthorized device 20. As will be discussed below in various embodiments, system 10 may use cloud 130 and Key Transparency server 140 (along with devices 100 and/or 110) to thwart this attack.

Cloud 130, in various embodiments, is a computer cluster configured to provide various services to devices 100 including the storage and synchronization of data between devices 100. In the illustrated embodiment, devices 100 use cloud 130 to exchange a private key (shown as account key 132) among one another. This account key 132 may then be used by devices 100 to sign their respective public keys 104 before they are provided to server 120. In other embodiments, account key 132 may be a symmetric key that is used to be produce a signed hash (e.g., a hash-based message authentication code (HMAC)) that can be used to verify public keys 104. In various embodiments, account key 132 is protected by another cryptographic key (not shown) that is held only by devices 100 and is provided to a new device 100 only after explicit authorization by the user via the user interface of one of devices 100. As such, unauthorized device 20 may not be able to obtain account key 132 and use it to generate the appropriate signature for its public key 24.

In some embodiments, IDS server 120 may refuse to accept an unsigned key 24 if no signature is present or if server 120 is unable to confirm that a signature of key 24 is produced by account key 132. In other embodiments, however, signature verification may be performed by devices 100 and/or messaging device 110. For example, messaging device 110 may initially send to devices 100, a list of public keys 104 and their corresponding signatures, and devices 100 may notify the users of devices 100 and 110 if any of the signatures are determined to be invalid (i.e., determined not to have originated from account key 132). Alternatively, devices 100 may send the public key corresponding to account key 132, and messaging device 110 may use the public key to validate the signatures received from IDS server 120. In some embodiments, public keys 104 and account key 132 are also periodically rolled/updated to prevent older keys 104 from being used.

Key Transparency server 140, in various embodiments, is configured to log the actions performed by IDS server 120 when server 120 registers devices. Accordingly, Key Transparency server 140 may receive change records 122 as information is updated by IDS server 120 and may store these records 122 in one or more transparency logs 142. The logs 142 may be append-only logs that use cryptographic chaining to make the stored information immutable. In the illustrated embodiment, user devices 100 (and/or device 110) may perform a verification exchange 146 with Key Transparency server 140 to confirm that the set of public keys 104 being provided by IDS server 120 is consistent with the set of valid public keys 104 noted in logs 142 and is consistent with the set of public keys 104 known to devices 100. If an inconsistency is found, devices 100 and/or device 110 may report the inconsistency to the users of devices 100 and 110. In some embodiments, each device 100 may store its public key in cloud 130 so that each other device 100 can be aware of the set of keys 104 believed to be valid by devices 100.

II. Manual Verification

Manual verification can be a technique for verifying the public key information without asking the key transparency server. The technique can be performed between two electronic devices (e.g., smartphones, tablet computers, laptop computers, desktop computers).

A. Example Sequence

Figure 2:
FIG. 2 illustrates a process for manual verification of public key information.

FIG. 2 illustrates a process 200 for manual verification of public key information. The process 200 can use an authentication protocol over an existing channel to receive short codes that can be compared via other communication paths (e.g., a voice call, a video call, or an electronic message). Upon successful verification, both the sending and receiving device can store the account key of the other device in a memory.

A user of a first electronic device can trigger the manual verification process by selecting an option for secure communication in a first user interface (discussed below) of an application (e.g., a contacts application). The first user interface can display contact information for another user. For example, a user of a first electronic device can find contact information stored in the first electronic device for another user. If the first user desires secure communication (e.g., secured messaging), the first user can select an option displayed in the first user interface to initiate the process of manual verification to verify the public keys for the first and the second electronic devices.

At 208, a first electronic device 202 can request a public key for a second electronic device 204 from a key server 206. The first electronic device 202 can request the public key from the key server 206 or from second electronic device 204 via a network (e.g., the Internet). Both the first electronic device 202 and the second electronic device 204 can have already registered their devices with key server 206, which stores public keys for electronic devices. The first electronic device 202 can store its own public key in a memory of the first electronic device 202. The first electronic device 202 can have previously downloaded the public key for the first electronic device 202 from a key server 206. Similarly, the second electronic device 204 can store its own public key in a memory of the second electronic device 204. The second electronic device 204 can have previously downloaded the public key for the second electronic device 204 from a key server 206.

At 210, the first electronic device 202 can download the public key for the second electronic device 204. The first electronic device 202 can store the public key for the second electronic device 204 in a memory of the first electronic device 202.

At 212, second electronic device 204 can download the public key for the first electronic device 202. The second electronic device 204 can store the public key for the first electronic device 202 in a memory of the second electronic device 204.

At 216, the second electronic device 204 can download the public key for the first electronic device 202. The public keys for electronic devices can be stored on a key server 206. The second electronic device 204 can store the public key for the first electronic device 202 in a memory of the second electronic device 204.

At 216, the first electronic device 202 can generate a first random number. The first random number can have a length that depends on a level of security desired. For example, the first random number can have the same length as the public key of the device. Examples of such lengths are 128 bits and 256 bits. The first random number can be stored in a memory of the first electronic device 202.

At 218, the second electronic device 204 can generate a second random number. The second random number can be generated in a similar manner as the first random number. One of skill in the art would appreciate the various ways to generate a random number, e.g., using a pseudorandom number generator, which may use time and local device information as a seed. The second random number can be stored in a memory of the second electronic device 204.

At 220, the first electronic device 202 can generate a commitment. A commitment can be a cryptographic primitive that allows one to commit to a chosen value while keeping it hidden to others, with the ability to reveal the committed value later. Commitment schemes can be designed so that a party does not change the value after they have committed to it. The first electronic device 202 can generate the commitment by executing a hash function on the first random number to generate a hash value, which is the commitment. In various implementations, multiple hash functions can be used, and additional inputs can be used, in addition to the first random number. The first electronic device 202 can store the commitment in a memory of the first electronic device 202.

At 222, the first electronic device 202 can communicate the commitment and the first electronic device public key to the second electronic device 204. The commitment and the first electronic device public key can be communicated via wired or wireless protocol. The commitment and the first electronic device public key can be communicated via a network (e.g., the Internet). The second electronic device 204 can store the commitment in a memory of the second electronic device 204.

At 224, the second electronic device 204 can communicate the second random number to the first electronic device 202. The second random number can be communicated via wired or wireless protocol. The second random number can be communicated via a network (e.g., the Internet). The first electronic device 202 can store the second random number in a memory of the device.

At 226, the first electronic device 202 can extract a first code by running the first random number, the second random number, the first public key for the first electronic device 202, and the second public key for the second electronic device 204 through the hash function. The first code can be stored in a memory on the first electronic device 202.

At 228, the second electronic device 202 can extract a second code by running the second random number, the commitment, the first public key, and the second public key for the second electronic device 204 through the hash function. The second code can be stored in a memory of the second electronic device 204.

At 230, the first electronic device 202 can provide (e.g., display or via audio) the first code in a user interface on the first electronic device 202.

At 232, the second electronic device 204 can display the second code in a user interface on the second electronic device 204.

At 234, a first user can confirm that the first code displayed on the first electronic device 202 matches the second code received from the second user using the second electronic device 204. The first user can recognize the voice of the second user and can confirm the sequence of numbers for the second code that the second user reads matches the first code displayed on the first electronic device 202. The first user can communicate to the second user via audio call, via a video call, or in person. In various embodiments, the second user can send an electronic message to the first user to confirm the code. If the second code matches the first code displayed on the electronic device, the first electronic device 202 can receive a confirmation by selecting the confirmation soft switch in a user interface on a display of the first electronic device 202. If the code is confirmed there can be an indication displayed on the user interface that the code has been verified.

At 236, a second user can confirm that the second code displayed on the second electronic device 204 matches the first code received from the first user using the first electronic device 202. The second user can recognize the voice of the first user and can confirm the sequence of numbers for the first code that the first user reads matches the second code displayed on the second electronic device 204. The second user can communicate to the first user via audio call, via a video call, or in person. In various embodiments, the first user can send an electronic message to the second user to confirm the code. If the first code matches the second code displayed on the second electronic device 204, the second electronic device 204 can receive a confirmation by selecting the confirmation soft switch in a user interface on a display of the second electronic device 204. If the code is confirmed there can be an indication displayed on the user interface that the code has been verified.

At 238, the first electronic device can store the confirmation of the first code in a memory of the first electronic device 202. If the code is confirmed, the first electronic device 202 can trust the public keys received from the key server 206.

At 240, the second electronic device can store the confirmation of the second code in a memory of the second electronic device 204. If the code is confirmed, the second electronic device 204 can trust the public keys received from the key server 206.

B. User Interfaces

As described above, a user can use an application to start a process for verifying a public key of another device. A user interface (UI) of the application can be used to start the verification process and to provide a short code, which can be compared to a short code from the other user to confirm a match.

FIG. 3 illustrates an example first user interface 300 for manual verification. The first user interface 300 can be displayed on a first electronic device 302 and a second electronic device 304. The first electronic device 302 can be the same as the first electronic device 202 illustrated in FIG. 2. The second electronic device 304 can be the same as the second electronic device 404 illustrated in FIG. 2. The first user interface 300 can represent a contact card. The contact card can be stored in a memory of the first electronic device 302 and the second electronic device 304. The contact card can provide contact information such as a name of contact 306, a mobile device number 308, an option to send messages 310, an option to share contact information 312, and option for secure communications 314.

By selecting the option to conduct secure communications 314 the first electronic device 304 or the second electronic device can initiate a process for manual verification. After receiving the selection of the secure communications 314 the electronic device can perform operations in FIG. 2 (e.g., steps 216, 220, 222, 226,) and generate a second user interface discussed in FIG. 4 (e.g., to performed step 230 in FIG. 2).

Figure 4:
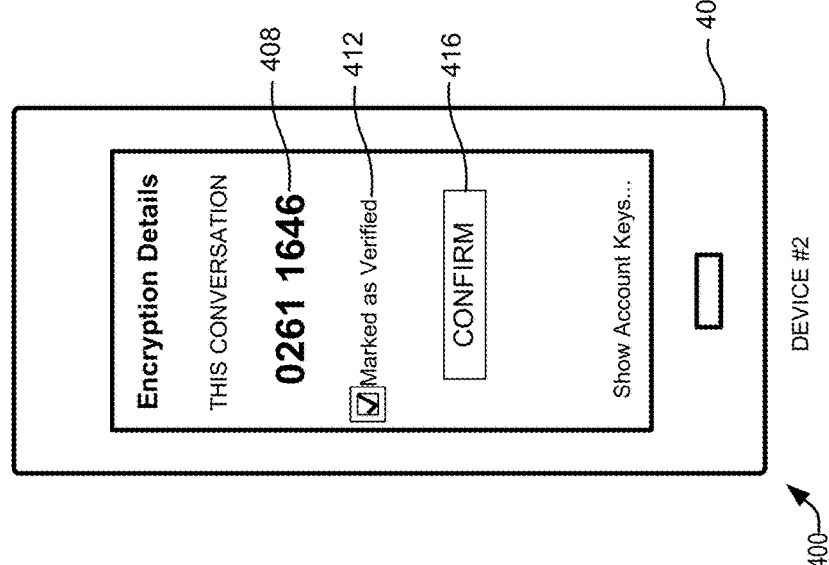
FIG. 4 illustrates an example second user interface for manual verification.

FIG. 4 illustrates a second example user interface 400 for manual verification. The second user interface 400 can be displayed on a first electronic device 402 and a second electronic device 404. The first electronic device 402 can be the same as the first electronic device 202 illustrated in FIG. 2. The second electronic device 404 can be the same as the second electronic device 404 illustrated in FIG. 2.

The first code 406 can be displayed in the user interface 400 of the first electronic device 402. The second code can be displayed in the second user interface 400 of the second electronic device 404. The second user interface 400 of the first electronic device 402 can display a soft switch (e.g., a software button) 414 that allows a user to select after the first code has been confirmed as described above. The second user interface 400 of the second electronic device 404 can display a soft switch (e.g., a software button) 416 that allows a user to select after the first code has been confirmed as described above. The first electronic device 402 can display a first indication 410 that the first code has been verified. The second electronic device 404 can display a second indication 412 has been verified.

C. Method

FIG. 5 is a flow chart of a process for manual verification of public key information. According to an example, one or more process blocks of FIG. 5 may be performed by a first electronic device.

At block 505, process 500 may include accessing a first public key associated with a first user identifier for the first electronic device. For example, the first electronic device may access first public key associated with a first user identifier for the first electronic device, as described above. The first public key can be stored in a memory of the first electronic device. The first public key can be previously downloaded from a key server.

At block 510, process 500 may include accessing a second public key associated with a second user identifier for a second electronic device. For example, the first electronic device may access a second public key associated with a second user identifier for a second electronic device, as described above. The first electronic device can request and download the public key associated with a second electronic device from a key server. The first electronic device can store the public key in a memory of the first electronic device.

In various embodiments, at least one of first public key and the second public key are downloaded from a key server.

At block 515, process 500 may include generating a first random number. For example, the first electronic device may generate a first random number, as described above. One of skill in the art would appreciate the various ways to generate a random number, e.g., using a pseudorandom number generator, which may use time and local device information as a seed. The first random number can be stored in the memory of the first electronic device.

The second electronic device can generate a second random number. The second random number can be stored in a memory of the second electronic device.

At block 520, process 500 may include generating a first commitment using a hash function and the first random number. For example, the first electronic device may generate a first commitment using a hash function and the first random number, as described above. The first commitment can be stored in the memory of the first electronic device.

At block 525, process 500 may include transmitting a first message to the second electronic device via a channel between the first electronic device and the second electronic device, the first message may include the first public key and the first commitment. The first channel may be an unsecure channel. For example, the first electronic device may transmit a first message to the second electronic device via a channel between the first electronic device and the second electronic device, the first message may include the first public key and the first commitment, as described above. The commitment and the first electronic device public key can be communicated via wired or wireless protocol. The commitment and the first electronic device public key can be communicated via a network (e.g., the Internet). The second electronic device can store the commitment in a memory of the second electronic device.

At block 530, process 500 may include receiving a second message from the second electronic device via the channel, the second message may include a second random number generated by the second electronic device. For example, the first electronic device may receive a second message from the second electronic device via the channel, the second message may include a second random number generated by the second electronic device, as described above. The second message can be communicated via wired or wireless protocol. The second message can be communicated via a network (e.g., the Internet). The first electronic device can store the second random number in a memory of the first electronic device.

At block 535, process 500 may include extracting a code via the hash function using the first public key, the second public key, the first random number, and the second random number. For example, the first electronic device may extract a code via the hash function using the first public key, the second public key, the first random number, and the second random number, as described above.

The code can be stored in a memory of the first electronic device. In various embodiments, the code is eight digits.

At block 540, process 500 may include presenting the code in a user interface of the first electronic device. For example, the first electronic device may display the code in the user interface of the first electronic device, as described above. In various embodiments, the code is visually perceivable.

A first user can confirm that the first code displayed on the first electronic device matches the second code received from the second user using the second electronic device. In various embodiments, process 500 may include receiving, from a second electronic device, audio data that includes an audible representation generated by second electronic device, where the audible representation represents the code. Thus, the code is audibly perceivable. The first user can recognize the voice of the second user and can confirm the sequence of numbers for the second code that the second user reads matches the first code displayed on the first electronic device 202. The first user can communicate to the second user via audio call, via a video call, or in person. In various embodiments, the second user can send an electronic message to the first user to confirm the code.

At block 545, process 500 may include receiving a code verification via the user interface that indicates that the code is verified. For example, the first electronic device may receive a code verification via the user interface that indicates that the code is verified, as described above. If the second code matches the first code displayed on the electronic device, the first electronic device can receive a confirmation by selecting the confirmation soft switch in a user interface on a display of the first electronic device. If the code is confirmed there can be an indication displayed on the user interface that the code has been verified.

At block 550, process 500 may include storing a confirmation for the second public key in a memory. For example, the first electronic device may store a confirmation for the second public key in a memory, as described above. In various embodiments, process 500 may include indicating that a messaging channel is secure upon receiving the confirmation.

Process 500 may include additional implementations, such as any single implementation or any combination of implementations described below and/or in connection with one or more other processes described elsewhere herein.

It should be noted that while FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

III. Opt-In/Opt-Out Feature

Electronic device users may want to control the use of key transparency features. Some legacy devices cannot support key transparency features. For example, a first user with a device that supports key transparency features may want to exchange messages with a second user with a legacy device that does not support key transparency features. If the key transparency features are enabled, noncompatible legacy devices cannot be added to the first user's account. In this case the first user may want to opt-out of the key transparency features. By opting out of the key transparency features, the first user can communicate with the second user even though the second user has a noncompatible device. Alternatively, if the first user wants to communicate with a third user having a device capable of key transparency features, the first user can then opt-in to the key transparency features to communicate with the third user.

The opt-in/opt-opt feature can be performed in conjunction with or separate from the manual verification features.

Opting-in can result in a number of changes for secure messaging on the electronic device. For example, the Key Directory Server may not permit a non-Key Transparency-compatible devices to be added to a user's list of authenticated peers. As another example Opted-in senders cannot send encrypted data using unverified public keys of opted-in recipients. For example, if the first device detects that a third device is not verified or a third account is "opted-out," the first device will not send encrypted data (e.g., secure messages) to the third device. As another example, opted-in users can see warnings indicating a "verification failure" for the first electronic device, other opted-in peers, including when that peer opts out, and for the system itself in the electronic messaging application on their electronic device. A verification failure can indicate that the first electronic device cannot participate in secure messaging. Additionally, opting-in can allow senders and recipients to perform manual verification.

A. System Diagram

Figure 6:
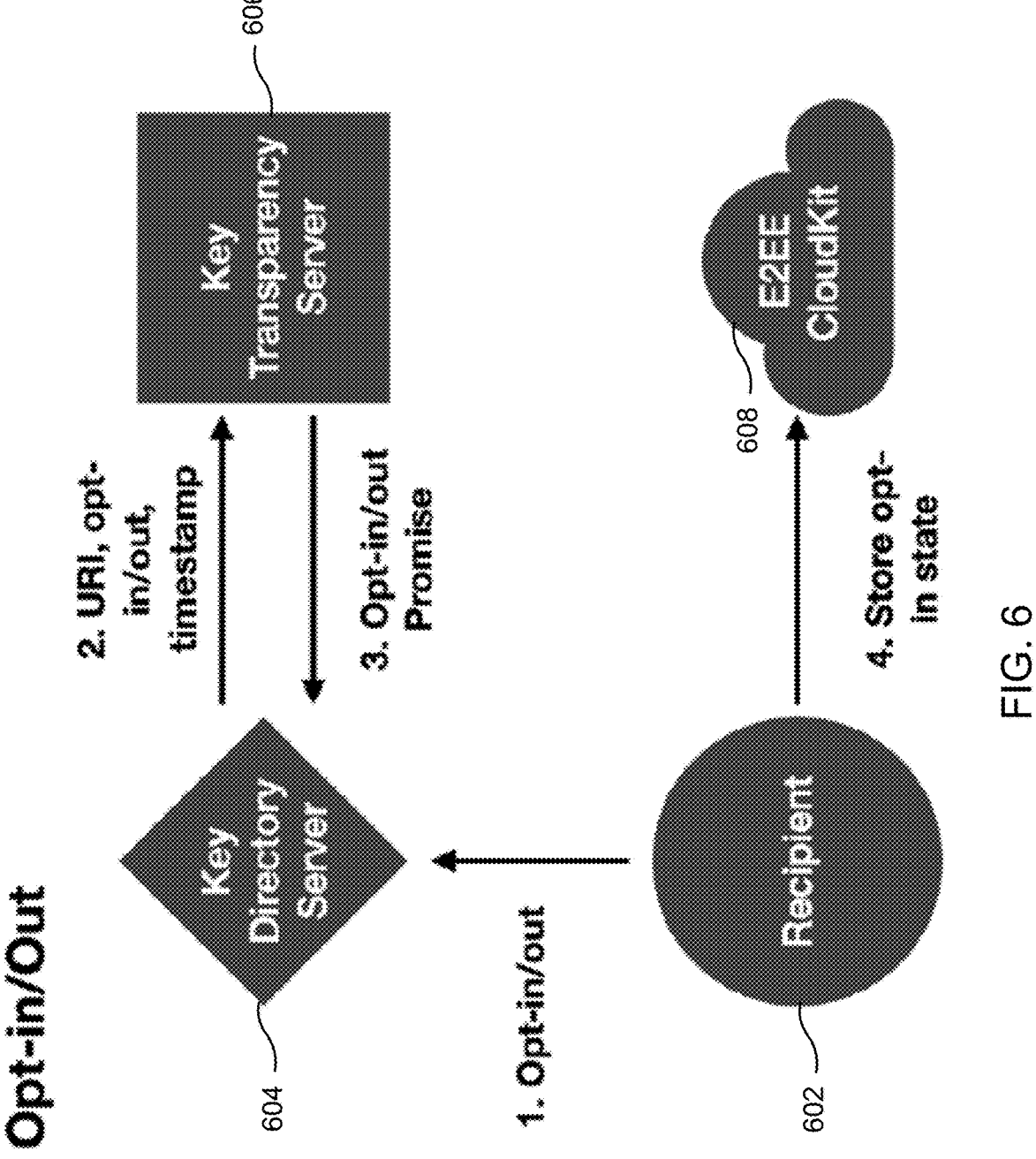
FIG. 6 illustrates an exemplary diagram for Opt-In/Opt-Out features.

FIG. 6 illustrates an exemplary diagram 600 for Opt-In/Opt-Out features. The Opt-In/Opt-Out device can involve several different entities that can communicate with each other. A recipient electronic device 602 can include electronic devices capable of conducting secured messaging (e.g., a smartphone, a tablet computer, a laptop computer, a desktop computer, or a wearable device).

A key directory Server 604 can be a server communicatively connected with a plurality of electronic devices via a network (e.g., the Internet). The key directory server 604 can receive and store addresses (e.g., media access control (MAC) address, Internet Protocol (IP) address, user identifier, IMEI, etc.), a user's public keys, and signatures for users. The key directory server 604 can communicate with a second server called the key transparency server 606. The key directory server 604 can receive requests from the electronic devices and send instructions for changes to the key transparency server 606.

The key transparency server 606 can makes changes (e.g., store, opt-in/out, mark for deletion) to the verifiable data structures based on the requests from the Key Directory Server 604 and a number of server invariant rules. The Key Transparency Server 606 can answer queries from the Sender and the Recipient so that they can verify the data they receive from the Key Directory Server 604 is auditable. The Key Transparency Server 606 can provide querying interfaces to allow an auditor and recipients/senders to verify correct operation.

The Key Transparency System can also include a secure storage 608. The secure storage 608 can be a cloud-based storage (e.g., end-to-end iCloud Storage).

At step 1, a first electronic device 602 can send a message to a key directory server to request an opt-in or opt-out of one or more key transparency features. The message can be sent via wired or wireless protocol. The message can be sent through a network (e.g., the Internet). The key directory server 604 can receive the message. The key directory server 506 can store the opt-in or opt-out request as a key transparency value. For example, the key transparency value can be "1" if the device opts-in. The key transparency value can be zero if the device opts-out.

To opt-in to use of key transparency features, the electronic device (e.g., a recipient device 602) can first performs a recipient query in order to verify that the user's account is in good state (e.g., updated devices, supported device configurations).

FIG. 7 illustrates a simplified flow for the recipient query process. At step 1, the recipient device 702 can query the key directory server 704 for user identifier related to the recipient device 702 and peer electronic devices. In response to the query, the key directory server 604 can send, at step 2, the addresses, public keys, and signatures of the recipient device 702 and associated peer electronic devices. At step 3, the recipient device 702 can query the key transparency server 706 for user identifier related to the recipient device 702 and peer electronic devices. At step 4, the key transparency server 706 can verify that every entry returned by the key directory server 704 (e.g., user identifier, addresses, public keys, and opt-in states) is in (or promised to be in) the verifiable data structures. At step 5, the recipient device can receive addresses, public keys, and opt-in states from the secure server 708. The recipient devices 702 can verify that the data received from the key directory server 704 matches the data stored in the secure storage 708.

Returning to FIG. 6, The key directory server 604 can store addresses (e.g., the media access control addresses (MAC)), the user's public keys, and signatures for recipients and provide that data to senders so they can send end-to-end encrypted data to the recipients. An address can be a unique identifier assigned to a network interface controller (NIC) for use as a network address in communications within a network segment. This use can be common in most IEEE 802 networking technologies, including Ethernet, Wi-Fi, and Bluetooth. Upon enrollment by a recipient, the Key Directory Server can store the address and public keys for the user identifier for recipient 602 in the Key Transparency Server 606. The user identifier can be a phone number or an email address.

Upon the Opt-In/Opt-Out request being sent by a recipient electronic device 602, at step 2, the Key Directory Server 604 can request an opt-in/out change from the Key Transparency Server 606. The Key Transparency Server 606 can make the requested changes (e.g., store, opt-in/opt-out, or delete) to the stored data.

At step 3, the Key Transparency Server 606 can make changes (e.g., store, opt-in/out, mark for deletion) to the stored user information based on the requests from the Key Directory Server 604 and a number of server invariant rules.

The server can enforce a series of rules in its operations which can be described in the context of the related data structures and procedures above. First, when a new set of trees are created, the very first node of the append-only PAT and TLT contains a special "configuration node." For the PAT, this node contains the VRF public keys, the PACL, PAT, and PAM SLH signing key, and the earliest supported client version. For the TLT this node contains the TLT SLH signing key and the earliest supported client version. Auditors and clients may only honor a configuration node in this position, and auditors should report an operational failure of any other node that contains configuration data.

The server can also log only one SMH per revision in the PAT and only one PAT SLH per application per revision in the TLT. Auditors should report any duplicates as a possible split-view attack.

The server can merge all promised mutations to the PAM within the maximum merge delay (MMD) according to the following rules.

The following rules can apply to the "Add Mutation" features. If an existing entry does not exist with matching primary key, the server creates the new entry and marks any conflicting entry. For the IDS PAM, if this entry represents a New Account for an existing user identifier, all other single data records in other accounts are marked for deletion (as each user identifier may only belong to one account at a time). For IDS PAM, if this entry represents a new client data for an existing device and application version, all other single data records are marked for deletion (as each device may only have one client data per version). If an existing entry exists and is not marked, the key transparency server will update the expiry timestamp if provided by the key directory server and changed by greater than one day (for debouncing purposes) and the earliest allowed deletion data to 7 days after the expiry timestamp. If an existing entry exists and is marked for deletion, the mark timestamp will be cleared, the added timestamp updated, and the earliest allow deletion date will be updated based on the expiry timestamp (if provided by the key directory server).

The following rules can apply to a "Mark Mutation" feature. If an entry does not exist with a matching primary key, the key transparency server will make no change. If an entry does exist and is not marked (i.e., the "mark for deletion" timestamp is not set), the server will remove the expiry timestamp and set the marked for deletion timestamp and the expected deletion to 7 days later. If an entry does exist and is already marked, the server will not update the marked for deletion timestamp but will update the expected deletion timestamp.

Any Add or Mark mutation to a Map Leaf can cause the server to "clean up" and delete any entries past their earliest allowed deletion timestamp, then delete any empty device records, then delete any empty account records.

The following rules can apply to the "Opt-In/Out Mutation" feature. The key transparency server can compare the latest entry in the opt-in/out history list to the opt-in/out entry in the mutation. If there are no existing opt-in/out entries or if the mutation has a different opt-in state than the latest entry, then the server will update the history list. It will add the new entry to the history list. The key transparency server will delete any entries older than 7 days but will always keep the two newest entries. The key transparency server will delete the oldest entry if there are more than 10 entries. If the opt-in/out mutation changes the opt-in state from opt-out to opt-in, the key transparency server will delete all marked entries in the Map Leaf, regardless of the entry's earliest allowed deletion timestamp.

The server will not delete an entry in the Map Leaf before the earliest allowed deletion timestamp outside of an opt-in mutation and will enforce that the earliest allowed deletion timestamp is at least MMD greater than the mark and/or expiry timestamps so that clients can detect issues before the entry is deleted. The Key Transparency Server 606 can maintain a set of Verifiable Log-Backed Maps (per application) and a top-level Verifiable Log. The Per-Application Verifiable Log-Backed Maps consist of a Per-Application Change Log (PACL), a Per-Application Map (PAM), a Per-Application Tree (PAT). The top-level Verifiable log can be called the Top-Level Tree (TLT). The Per-Application Change Log (PACL) stores changes to the PAM in a verifiable append-only log. The PAM can be completely reconstructed from the PACL entries and the server invariant rules. The Per-Application Map (PAM) can be a sparse Merkle Tree with depth 256 composed of nodes, each of which consists of blinded address and public key data and indexed by a hash (e.g., SHA-256 hash) of the output of the verifiable random function of the uniform resource identifier.

Users may opt-out either via their device or via the device manufacturer web portal. In both cases, the Key Directory server 604 can be first requested to opt-out, and it in turn requests opt-out of the user identifiers by the Key Transparency Server 606. The Key Transparency server 606 makes the same changes to the Per Application Map (PAM) with the opt-in state being false. The opt-in or opt-out state can also be stored in a secure server 608 (e.g., E2EE CloudKit) using the recipient device 602. If the user opts out via the web portal, Recipient Query will fail on devices supporting key transparency because the server opt-in state does not match the Key Transparency Server's state, which may be indicative of an attack.

B. Flowchart

FIG. 8 is a flow chart of a process 800, according to an example of the present disclosure. According to an example, one or more process blocks of FIG. 8 may be performed by an electronic device.

At block 805, process 800 may include receiving, via a user interface, an input identifying selection of a key transparency value. The key transparency value can indicate whether the electronic device participates in a key transparency feature. The key transparency value can indicate that the electronic device is opted-in for the key transparency feature or opted-out for a key transparency feature. For example, the key transparency value can be "1" if the device opts-in. The key transparency value can be zero if the device opts-out. The input can be a selection of a software switch (e.g., a button on a graphical user interface). The key transparency value can be stored in a memory of the electronic device.

At block 810, process 800 may include querying a server device a status of an account associated with a first user identifier of the electronic device. For example, electronic device may query key directory server device the status of an account associated with a first user identifier of the electronic device, as described above in Section IIIB and step 1 of FIG. 7. In various embodiments, process 800 can further include rejecting devices for which the public keys are not stored in the key transparency server. Therefore, if the public keys for the electronic device are not stored in the key transparency server, then the opt-in/opt-out requests will fail.

The first electronic device can send an electronic message to the key directory server; the message can include instructions to query the key directory server to see if there is a key transparency value stored for the first electronic device. The instructions can also query the key directory server for user identifier information for the first electronic device and associated electronic devices.

In various embodiments, the verifying of the status of an account may include determining that one or more devices associated with the account associated with the first user identifier are updated; and determining that the one or more devices associated with the account include supported device configurations. This process can be called recipient query and the process is described above with regards to FIG. 7.

At block 815, process 800 may include in response to verification of the status of the account associated with the first user, transmitting the key transparency value to a key transparency server. The key directory server can request an opt-in/out change from the key transparency server. The key directory server can store the changes from the opt-in/out request. For example, the electronic device may in response to verification of the status of the account associated with the first user, provide the key transparency value to a key transparency server, as described above as described in Section IIIB, step 2 of FIG. 6. The electronic device can provide the key transparency value to the key transparency server via a message that can be communicated via a network (e.g., the Internet) via wired or wireless protocol.

In various embodiments, process 800 further includes recording a state of an opt-in request in a secure storage that is shared by all devices associated with the account. The secure storage can be end-to-end encrypted. The secure storage can be a cloud container.

In various embodiments, a default key transparency value for a key transparency capable electronic device can indicate that the electronic device is opted-in by default. In this case, if the user does not want the device to enable key transparency features, the user will need to opt-out of the key transparency features.

At block 820, process 800 may include receiving a notification from the key transparency server that the first user identifier is stored in the key transparency server. The notification can indicate a timestamp indicating a time of a last state change of the key transparency feature for the first user identifier.

Process 800 may include additional implementations, such as any single implementation or any combination of implementations described below and/or in connection with one or more other processes described elsewhere herein. In a first implementation, a default key transparency value is an opt-out value that corresponds to an opt-out of the key transparency feature of the electronic device.

In various embodiments, the electronic device can include one or more memories; and one or more processors in communication with the one or more memories and configured to execute instructions stored in the one or more memories to performing any one or more of operations as described above.

In various embodiments, the instructions can be stored on non-transitory computer readable medium that when executed by one or more processors of a computing device, cause the one or more processors to perform any one or more of the operations described above.

It should be noted that while FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

IV. Example Device

Figure 9:
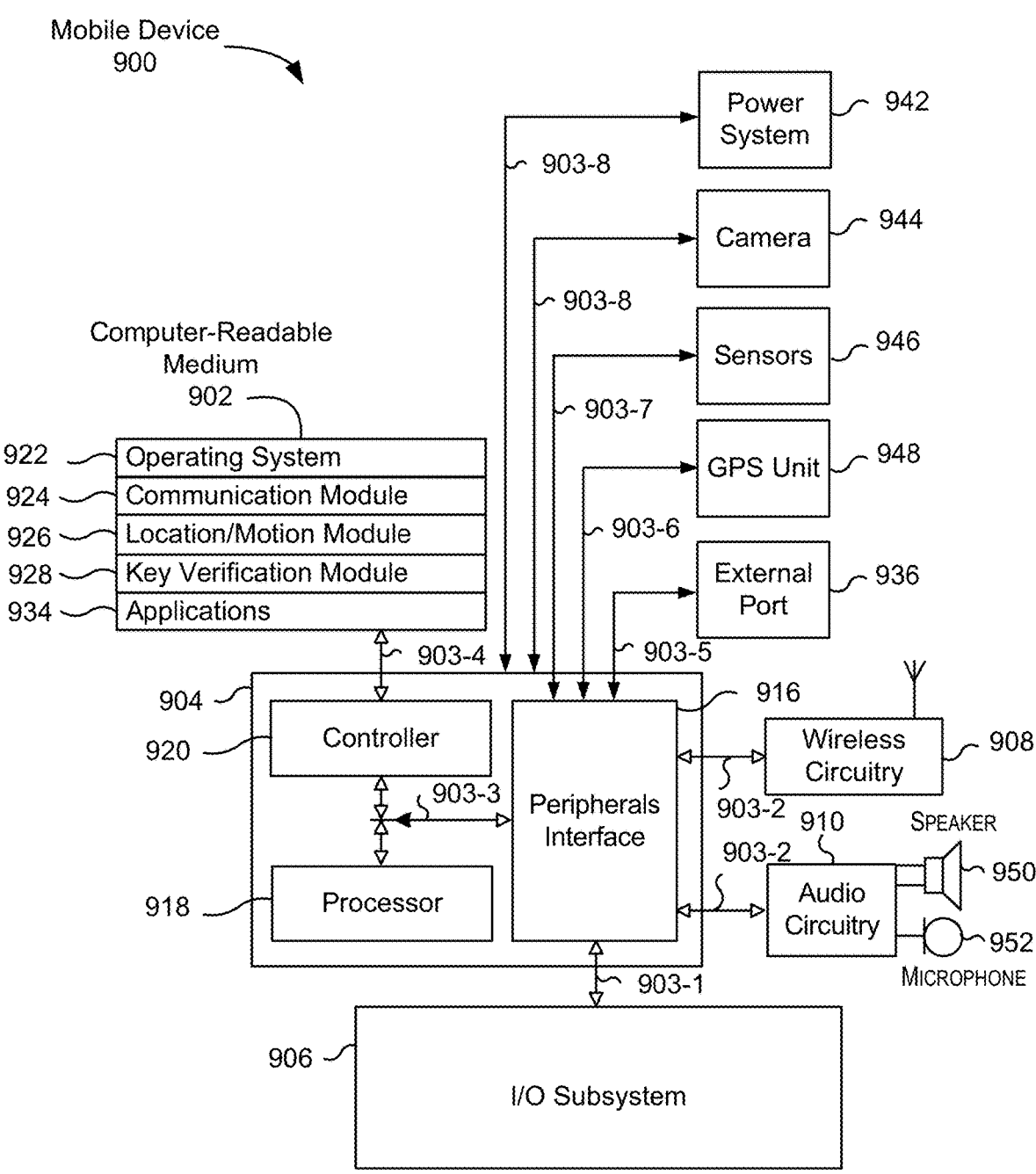
FIG. 9 is a block diagram of an example electronic device.

FIG. 9 is a block diagram of an example electronic device 900. Device 900 generally includes computer-readable medium 902, a processing system 904, an Input/Output (I/O) subsystem 906, wireless circuitry 908, and audio circuitry 910 including speaker 912 and microphone 914. These components may be coupled by one or more communication buses or signal lines 903. Device 900 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

it should be apparent that the architecture shown in FIG. 9 is only one example of an architecture for device 900, and that device 900 can have more or fewer components than shown, or a different configuration of components. The various components shown in FIG. 9 can be implemented in hardware, software, or a combination of both hardware and software, including one or more signal processing and/or application specific integrated circuits.

Wireless circuitry 908 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 908 can use various protocols, e.g., as described herein. In various embodiments, wireless circuitry 908 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 908 is coupled to processing system 904 via peripherals interface 916. Peripherals interface 916 can include conventional components for establishing and maintaining communication between peripherals and processing system 904. Voice and data information received by wireless circuitry 908 (e.g., in speech recognition or voice command applications) is sent to one or more processors 918 via peripherals interface 916. One or more processors 918 are configurable to process various data formats for one or more application programs 934 stored on medium 902.

Peripherals interface 916 couple the input and output peripherals of device 900 to the one or more processors 918 and computer-readable medium 902. One or more processors 918 communicate with computer-readable medium 902 via a controller 920. Computer-readable medium 902 can be any device or medium that can store code and/or data for use by one or more processors 918. Computer-readable medium 902 can include a memory hierarchy, including cache, main memory, and secondary memory. The memory hierarchy can be implemented using any combination of a random-access memory (RAM) (e.g., static random access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 916, one or more processors 918, and controller 920 can be implemented on a single chip, such as processing system 904. In some other embodiments, they can be implemented on separate chips.

Processor(s) 918 can include hardware and/or software elements that perform one or more processing functions, such as mathematical operations, logical operations, data manipulation operations, data transfer operations, controlling the reception of user input, controlling output of information to users, or the like. Processor(s) 918 can be embodied as one or more hardware processors, microprocessors, microcontrollers, field programmable gate arrays (FPGAs), application-specified integrated circuits (ASICs), or the like.

Device 900 also includes a power system 942 for powering the various hardware components. Power system 942 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 900 includes a camera 944. In some embodiments, device 900 includes sensors 946. Sensors can include accelerometers, compass, gyrometer, pressure sensors, audio sensors, light sensors, barometers, and the like. Sensors 946 can be used to sense location aspects, such as auditory or light signatures of a location.

In some embodiments, device 900 can include a GPS receiver, sometimes referred to as a GPS unit 948. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 918 run various software components stored in medium 902 to perform various functions for device 900. In some embodiments, the software components include an operating system 922, a communication module 924 (or set of instructions), a location module 926 (or set of instructions), a key verification module 928 that is used as part of ranging operation described herein, and other application programs 934 (or set of instructions).

Operating system 922 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 924 facilitates communication with other devices over one or more external ports 936 or via wireless circuitry 908 and includes various software components for handling data received from wireless circuitry 908 and/or external port 936. External port 936 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 926 can assist in determining the current position (e.g., coordinates or other geographic location identifiers) and motion of device 900. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 926 receives data from GPS unit 948 and analyzes the signals to determine the current position of the mobile device. In some embodiments, location/motion module 926 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 908 and is passed to location/motion module 926. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 900 based on the position coordinates of the corresponding transmitters. Regardless of the specific location technology used, location/motion module 926 receives information from which a location fix can be derived, interprets that information, and returns location information, such as geographic coordinates, latitude/longitude, or other location fix data A key verification module 928 can receive and store a data structure used for key verification procedures. The key verification module can store one or more instructions for calculating a hash of various data structures. The key verification module 928 can secure one or more keys for the electronic device and associated electronic devices. The key transparency module 928 can store instructions for performing manual verification, a consistency check, and peer-to-peer key verification.

The one or more applications 934 on device 900 can include any applications installed on the device 900, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating, and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 906 can be coupled to a display system (not shown), which can be a touch-sensitive display. The display displays visual output to the user in a graphical user interface (GUI). The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 906 can include a display and user input devices such as a keyboard, mouse, and/or trackpad. In some embodiments, I/O subsystem 906 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 902) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 906 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 900 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display, or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable execut- able code; a dedicated logic circuit can be configured by suitably connecting logic gates and other circuit elements; and so on.

Any of the software components or functions described in this application, may be implemented as software code to be executed by a processor using any suitable computer lan- guage such as, for example, Java, C++, or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer read- able medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g., a hard drive or an entire computer system), and may be present on or within different computer program products within a system or network. A computer system may include a monitor, printer, or other suitable display for providing any of the results mentioned herein to a user.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of proto- cols, including the Internet, thereby allowing distribution, e.g., via Internet download. Any such computer readable medium may reside on or within a single computer product (e.g., a solid-state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal infor- mation data that benefit the user are also contemplated by the present disclosure. For instance, health and fitness data may be shared to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or pri- vacy practices. In particular, such entities should implement and consistently use privacy policies and practices that are generally recognized as meeting or exceeding industry or governmental requirements for maintaining personal infor- mation data private and secure. Such policies should be easily accessible by users and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific consid- erations. For instance, in the US, collection of or access to certain health data may be governed by federal and/or state laws, such as the Health Insurance Portability and Account- ability Act (HIPAA); whereas health data in other countries may be subject to other regulations and policies and should be handled accordingly. Hence different privacy practices should be maintained for different personal data types in each country.

Despite the foregoing, the present disclosure also con- templates embodiments in which users selectively block the use of, or access to, personal information data. That is, the present disclosure contemplates that hardware and/or soft- ware elements can be provided to prevent or block access to such personal information data. For example, in the case of sharing content and performing ranging, the present tech- nology can be configured to allow users to select to "opt in" or "opt out" of participation in the collection of personal information data during registration for services or anytime thereafter. In addition to providing "opt in" and "opt out" options, the present disclosure contemplates providing noti- fications relating to the access or use of personal informa- tion. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted being prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All references, including publications, patent applications, and patents, cited herein are hereby incorporated by reference to the same extent as if each reference were individually and specifically indicated to be incorporated by reference and were set forth in its entirety herein.

What is claimed is:

1. A method performed by a first electronic device, the method comprising:

accessing first public key associated with a first user identifier for the first electronic device;

accessing a second public key associated with a second user identifier for a second electronic device;

generating a first random number;

generating a first commitment using a hash function and the first random number;

transmitting a first message to the second electronic device via a channel between the first electronic device and the second electronic device, the first message comprising the first public key and the first commitment;

receiving a second message from the second electronic device via the channel, the second message comprising a second random number generated by the second electronic device;

extracting a code via the hash function using the first public key, the second public key, the first random number, and the second random number;

presenting the code to a user of the first electronic device;

receiving a code verification via a user interface that indicates that the code is verified; and storing a confirmation for the second public key in a memory of the first electronic device.

2. The method of claim 1, further comprising receiving, from the second electronic device, audio data that includes an audible representation generated by the second electronic device, wherein the audible representation represents the code.

3. The method of claim 1, where at least one of first public key and the second public key are downloaded from a key server.

4. The method of claim 1, wherein the code is visually perceivable.

5. The method of claim 1, wherein the code is audibly perceivable.

6. The method of claim 1, further comprising:

receiving, via a user interface, input identifying selection of a key transparency value, wherein the key transparency value indicates whether the first electronic device participates in a key transparency feature;

querying a server device, for a status of an account associated with a first user identifier of the first electronic device;

in response to verification of the status of the account associated with the first user identifier, providing the key transparency value to a key transparency server; and receiving:

1) A notification from the key transparency server that the first user identifier is stored in the key transparency server, and 2) A timestamp indicating a time of a last state change of the key transparency feature for the first user identifier.

7. The method of claim 6, wherein a default key transparency value is an opt-in value that corresponds to an opt-in of the key transparency feature of the first electronic device.

8. The method of claim 6, further comprising rejecting device keys not stored in the key transparency server.

9. The method of claim 6, wherein the verification of the status of an account comprises:

determining that one or more devices associated with the account associated with the first user identifier are updated; and determining that the one or more devices associated with the account include supported device configurations.

10. The method of claim 6, further comprising:

recording a state of an opt-in request in a cloud container shared by all devices associated with the account.

11. A computing device, comprising:

a non-transitory computer readable medium; and one or more processors in communication with the non-transitory computer readable medium and configured to execute instructions stored in the non-transitory computer readable medium to perform operations comprising:

accessing first public key associated with a first user identifier for the computing device;

accessing a second public key associated with a second user identifier for a second electronic device;

generating a first random number;

generating a first commitment using a hash function and the first random number;

transmitting a first message to the second electronic device via a channel between the computing device and the second electronic device, the first message comprising the first public key and the first commitment;

receiving a second message from the second electronic device via the channel, the second message comprising a second random number generated by the second electronic device;

extracting a code via the hash function using the first public key, the second public key, the first random number, and the second random number;

presenting the code to a user of the computing device;

receiving a code verification via a user interface that indicates that the code is verified; and storing a confirmation for the second public key in a memory of the computing device.

12. The computing device of claim 11, wherein the operations further comprise receiving, from the second electronic device, audio data that includes an audible representation generated by the second electronic device, wherein the audible representation represents the code.

13. The computing device of claim 11, wherein the code is visually perceivable.

14. The computing device of claim 11, wherein the code is audibly perceivable.

15. The computing device of claim 11, wherein the operations further comprise indicating that a messaging channel is secure upon receiving the confirmation.

16. The computing device of claim 11, wherein the operations further comprise:

receiving, via a user interface, input identifying selection of a key transparency value, wherein the key transparency value indicates whether the computing device participates in a key transparency feature;

querying a server device, for a status of an account associated with a first user identifier of the computing device;

in response to verification of the status of the account associated with the first user identifier, providing the key transparency value to a key transparency server; and receiving:

1) A notification from the key transparency server that the first user identifier is stored in the key transparency server, and 2) a timestamp indicating a time of a last state change of the key transparency feature for the first user identifier.

17. The computing device of claim 16, wherein a default key transparency value is an opt-out value that corresponds to an opt-out of the key transparency feature of the computing device.

18. The computing device of claim 16, wherein the operations further comprise rejecting device keys not stored in the key transparency server.

19. The computing device of claim 16, wherein the verification of the status of an account comprises:

determining that one or more devices associated with the account associated with the first user identifier are updated; and determining that the one or more devices associated with the account include supported device configurations.

20. The computing device of claim 16, wherein the operations further comprise:

recording a state of an opt-in request in a cloud container shared by all devices associated with the account.

\* \* \* \* \*